(12) United States Patent
Baldi et al.

(10) Patent No.: US 9,969,646 B2
(45) Date of Patent: May 15, 2018

(54) PROCESS FOR THE PREPARATION OF CERAMIC GLASS MATERIAL IN THE FORM OF SHEETS, SHEETS THUS OBTAINED AND USE THEREOF

(75) Inventors: Giovanni Baldi, Montespertoli (IT); Gaudenzio Borelli, Cerreto Guidi (IT); Alessio Antonini, Vinci (IT); Marco Bitossi, Montelupo Fiorentino (IT)

(73) Assignee: Colorobbia Italia S.P.A., Sovigliana Vinci (IT)

( * ) Notice: Subject to any disclaimer, the term of this patent is extended or adjusted under 35 U.S.C. 154(b) by 0 days. days.

(21) Appl. No.: 12/441,693

(22) PCT Filed: Sep. 17, 2007

(86) PCT No.: PCT/EP2007/059787
§ 371 (c)(1),
(2), (4) Date: Mar. 17, 2009

(87) PCT Pub. No.: WO2008/034797
PCT Pub. Date: Mar. 27, 2008

(65) Prior Publication Data
US 2010/0069218 A1 Mar. 18, 2010

(30) Foreign Application Priority Data
Sep. 18, 2006 (IT) ................. FI2006A0231

(51) Int. Cl.
| C03C 10/12 | (2006.01) |
| C03B 13/00 | (2006.01) |
| C03B 32/02 | (2006.01) |
| C03C 10/00 | (2006.01) |

(52) U.S. Cl.
CPC .......... *C03C 10/0027* (2013.01); *C03B 32/02* (2013.01)

(58) Field of Classification Search
CPC ................ C03C 10/0027; C03B 32/02; C03B 13/00–13/186

USPC ................................................ 65/33.8; 501/7
See application file for complete search history.

(56) References Cited

U.S. PATENT DOCUMENTS

| 3,771,984 | A | * | 11/1973 | Demarest, Jr. .......... C03B 5/265 65/195 |
| 5,691,256 | A | * | 11/1997 | Taguchi et al. .................. 501/63 |
| 5,820,989 | A |   | 10/1998 | Reed et al. |
| 6,086,977 | A | * | 7/2000  | Suzuki et al. ................ 428/141 |
| 6,372,319 | B1 |  | 4/2002  | Abe et al. |
| 6,413,906 | B1| * | 7/2002  | Shimatani et al. ............... 501/4 |
| 6,593,257 | B1|   | 7/2003  | Nagata et al. |
| 2002/0010064 | A1| * | 1/2002 | Ota et al. .......................... 501/7 |
| 2002/0058578 | A1| * | 5/2002 | Shindo ............................ 501/67 |
| 2003/0054935 | A1|   | 3/2003 | Kitamura et al. |
| 2003/0073563 | A1| * | 4/2003 | Brodkin et al. .................. 501/5 |
| 2004/0157720 | A1|   | 8/2004 | Sakamoto et al. |
| 2005/0016214 | A1| * | 1/2005 | Hsu et al. ...................... 65/33.9 |

FOREIGN PATENT DOCUMENTS

| CN | 1495144 A | 5/2004 |
| DE | 102005033908 B3 | 5/2006 |
| EP | 1026129 A1 | 8/2000 |
| EP | 1074520 A1 | 2/2001 |
| EP | 1146018 A1 | 10/2001 |
| EP | 1435343 A1 | 7/2004 |
| JP | 05-193985 | 8/1993 |
| JP | 2001019485 | 1/2001 |

OTHER PUBLICATIONS

Wikipedia: Float Glass, Nov. 10, 2014.
Tooley, "Section 11 Flat Glass Manufacturing Process," The Handbook of Glass Manufacture (2):714-3 to 714-21 (1984).

* cited by examiner

*Primary Examiner* — Erin Snelting
(74) *Attorney, Agent, or Firm* — LeClairRyan PLLC

(57) ABSTRACT

A process allowing to obtain ceramic glass material in the form of sheets of large dimensions usable in constructions for panelling or for flooring is described.

8 Claims, No Drawings

PROCESS FOR THE PREPARATION OF CERAMIC GLASS MATERIAL IN THE FORM OF SHEETS, SHEETS THUS OBTAINED AND USE THEREOF

FIELD OF THE INVENTION

The present invention relates to the field of ceramic materials and of the manufacturing processes thereof.

STATE OF THE ART

As it is known, glass is an amorphous material obtained by melting of crystalline compounds, normally oxides, and subsequent cooling of the molten mass.

On the contrary, to obtain ceramic glass materials, appropriate mixtures of oxides are melted, the molten mass thus obtained is subjected to rapid cooling by means of shaping operations (static or roller pressing, centrifugation, injection, blowing, extrusion, hot bending) then the semi-finished product is subjected to appropriate thermal cycles in which (homogeneous or heterogeneous) crystalline nuclei are developed and subsequently grow.

The presence of crystalline phases and the particular microstructure determined by the contemporary presence of these with the amorphous matrix imparts chemical-physical features superior to those of the initial glass to the final material (hardness, gloss, resistance to stresses and to etching, etc.) which make it particularly useful in various fields and that have nothing in common with the analogous properties of glass.

The processing cycles of glass and ceramic glass are obviously entirely different also because it is not possible to continuously process the molten oxide mass which, as mentioned above, constitutes the first step of the preparation and which is rapidly cooled by means of various shaping operations (static or roller pressing). On the other hand, it is apparent how useful it would be to be able to subject the molten mass of ceramic glass material precursors to the normal manufacturing cycles used for manufacturing glass both for process simplicity and because this would allow to obtain the final material with extreme ease and in formats of any desired dimensions.

SUMMARY OF THE INVENTION

The Applicant has now devised a process with which it is possible to process the molten oxide mass for ceramic glass material implementing the same operations and exploiting the same industrial equipment commonly used for processing and manufacturing glass.

DETAILED DESCRIPTION OF THE INVENTION

The present invention consists in overcoming the aforesaid problems in virtue of a process which comprises the melting of an appropriate mixture of oxides, the processing of the molten mass according to the normal glass manufacturing processes (rolling, shaping, blowing, etc.) and the subsequent treatment of the material thus obtained in appropriate crystallisation cycles.

According to the invention, the mixture of initial oxides essentially consists of $SiO_2$, $Al_2O_3$ and $Li_2O$ possibly in presence of other oxides.

Preferably, according to the invention, the percentages of the three aforesaid components (expressed by weight with respect to the total weight of the final mixture) are:

$SiO_2$: 50% -80%; $Al_2O_3$: 5% -30%; $Li_2O$ 3% -20%

The other oxides possibly present are chosen from the group consisting of ZnO, $P_2O_5$, $K_2O$, $Na_2O$, CaO, MgO, BaO.

More preferably, the aforesaid oxides, if present in the mixture, represents a percentage by weight comprised between respectively:

ZnO: 0.1 -3%; $P_2O_5$: 0.1-5%; $K_2O$: 1-5%, $Na_2O$: 0.1-6%, CaO: 0.1-6%; MgO: 0.1-6%, BaO: 0.1-5%; $ZrO_2$: 0.1-4%.

The oxide mixtures as described above present a melting point from 1500 to 1550° C. and may therefore be melted in the normal gas ovens used for melting glass and the molten materials are free from batch stones and bubbles and with a viscosity so as to allow the further forming process thereof.

The forming process and the subsequent annealing is performed in the normal processing conditions used for glass forming.

For example, the molten material is rolled by making it pass through a roller system which at the same time squeezes the laminate to the required thickness and feeds it forward. Subsequently, the continuous sheet thus formed enters in a controlled temperature oven called annealing oven which allows to relieve possible mechanical stresses caused to the glass during the roller forming step. At the exit of the annealing oven, the edges of the sheet are cut, possibly straightened and cut according to appropriate sizes, the process allows, for example, the continuous manufacturing of sheets of large dimensions.

Preferably, the mass is processed at viscosity of about Log $\eta=4$.

Normally, the molten mass during the pressing process is subjected to a rapid cooling, to a temperature corresponding to $\log\eta=13$, at which the accumulated stresses are dissipated in a time of approximately 1 hour.

In addition to the composition of the mixture, the thermal crystallisation cycle is also important for the process according to the invention.

Said thermal cycle must be performed at a temperature from 550° C. to 920° C. and for times from 2 to 6 hours, the overall cycle lasting for 12-25 hours.

By varying the times and the temperature within the aforesaid intervals it is also possible to vary the appearance features of each material.

For example, starting from a temperature of 550° C. and varying it in 20° C. step increases, it is possible to obtain a range which spans from the blue effect due to the Tyndall phenomenon, to semi-transparent up to a perfectly opaque white.

Some examples of preparation of ceramic glass materials according to the invention are shown below.

EXAMPLE 1

A mixture of oxides having the following composition:

| Oxides | wt % |
| --- | --- |
| $SiO_2$ | 78.61 |
| $Al_2O_3$ | 5.35 |
| ZnO | 0.52 |
| $Li_2O$ | 11.23 |
| $P_2O_5$ | 1.95 |
| $K_2O$ | 2.34 | was melted in a gas furnace (oxygen-methane) at the temperature of 1450° C. After approximately 36 hours, the molten material appears perfectly refined, and is thus taken to processing temperature (log η=4) and shaped according to the known technique for glass processing, in the desired shape and dimensions. In this case, the molten mass during the pressing process is subjected to a rapid cooling, to a temperature corresponding to log η=13, and maintained constant so that the accumulated stresses are dissipated in a time of approximately 1 hour.

The crystallisation cycle was performed by maintaining the sheet at 820° C. for 1 hour and then constantly decreasing the temperature to reach the ambient temperature in 12 hours.

Diffraction analysis shows how after crystallisation at 820° C. for 130 minutes the following phases are present: beta-quartz [11-0252] and lithium silicate $Li_2Si_2O_5$ [40-0376] (JCPDS (Joint Committee on Powder Diffraction Standards) numbering).

Mechanical features:
Microhardness: 740 Hv (charge=100 g)
Other features:

| Test type | Determination method | Minimum values |
| --- | --- | --- |
| Water absorption | EN 99 | <0.5% |
| Bending strength | EN 100 | >27 N/mm$^2$ |
| Tensile strength | | >200-250 Kg |
| Abrasion resistance | EN 102-EN 154 | <205 mm$^3$ |
| Hardness | EN 101-EN 176 | >6 |
| Thermal shock resistance | EN 104-EN 176 | Must pass test |
| Frost resistance | EN 102 | Must pass test |
| Resistance to chemicals | EN 106-EN 122 | Must pass test |

EXAMPLE 2

A mixture of oxides having the following composition:

| Oxides | wt % |
| --- | --- |
| SiO$_2$ | 74.61 |
| Al$_2$O$_3$ | 9.35 |
| ZnO | 0.52 |
| Li$_2$O | 11.23 |
| P$_2$O$_5$ | 1.95 |
| K$_2$O | 2.34 | was melted in a gas furnace (oxygen-methane) at a temperature of 1450° C. After approximately 36 hours, the molten material appears perfectly refined, and is thus taken to processing temperature (log η=4) and shaped according to the technique, desired shape and dimensions. In this case, the molten mass during the pressing process is subjected to a rapid cooling, to a temperature corresponding to approximately log η=13, and maintained constant so that the accumulated stresses are dissipated in a time of approximately 1 hour.

The crystallisation cycle was performed by maintaining the sheet at 900° C. for 1 hour and then constantly lowering the temperature to reach the ambient temperature in 12 hours.

Diffraction analysis shows how after crystallisation at 900° C. for 60 minutes the following phases are present: lithium aluminium silicate [35-0794] and lithium silicate $Li_2Si_2O_5$ [40-0376].

Mechanical features:
Microhardness 832 Hv (charge=100 g)
Other features:

| Test type | Determination method | Minimum values |
| --- | --- | --- |
| Water absorption | EN 99 | <0.5% |
| Bending strength | EN 100 | >27 N/mm$^2$ |
| Tensile strength | | >200-250 Kg |
| Thermal shock resistance | EN 104-EN 176 | Must pass test |
| Resistance to etching | EN 106-EN 122 | Must pass test |

EXAMPLE 3

A mixture of oxides having the following composition:

| Oxides | wt % |
| --- | --- |
| SiO$_2$ | 75.60 |
| Al$_2$O$_3$ | 8.35 |
| ZnO | 0.50 |
| Li$_2$O | 9.75 |
| P$_2$O$_5$ | 1.95 |
| K$_2$O | 2.35 |
| Na$_2$O | 1.00 |
| CaO | 0.50 | was melted in a gas furnace (oxygen-methane) at a temperature of 1450° C. After approximately 36 hours, the molten material appears perfectly refined, and is thus taken to processing temperature (log η=4) and shaped according to the technique, desired shape and dimensions.

In this case, the molten mass during the pressing process is subjected to a rapid cooling, to a temperature corresponding to log η=13 and maintained constant so that the accumulated stresses are dissipated in a time of approximately 1 hour.

The crystallisation cycle was performed by raising the temperature to 820° C. in approximately 4 hours, maintaining it constant for 4 hours, and then lowering it again to reach the ambient temperature in 12 hours.

Diffraction analysis shows how after crystallisation at 820° C. for 4 hours lithium aluminium silicate [21-0503] and lithium silicate $Li_2Si_2O_5$ [40-0376].

Mechanical features:
Microhardness: 830 Hv (charge=100 g)
Other features:

| Test type | Determination method | Minimum values |
| --- | --- | --- |
| Water absorption | EN 99 | <0.5% |
| Bending strength | EN 100 | >27 N/mm$^2$ |
| Tensile strength | | >200-250 Kg |
| Abrasion resistance | EN 102-EN 154 | <205 mm$^3$ |
| Hardness | EN 101-EN 176 | >6 |
| Thermal shock resistance | EN 104-EN 176 | Must pass test |
| Frost resistance | EN 102 | Must pass test |
| Resistance to etching | EN 106-EN 122 | Must pass test |

Similarly to that described in the preceding examples, similar results have been obtained using the following oxide mixtures:

|  | Formulation A | Formulation B | Formulation C | Formulation D |
|---|---|---|---|---|
| SiO2 | 77.61 | 78.46 | 75.59 | 75.13 |
| Li2O | 10.23 | 7.23 | 11.24 | 9.68 |
| Al2O3 | 5.35 | 5.49 | 5.36 | 8.31 |
| K2O | 2.34 | 2.34 | 2.34 | 2.33 |
| P2O5 | 2.95 | 1.95 | 1.95 | 1.94 |
| ZnO | 1.52 | 4.52 | 0.52 | 0.52 |
| MgO | — | 1.00 | 3.00 | — |
| BaO | — | — | — | 0.93 |
| ZrO2 | — | — | — | 1.14 |

By proceeding as shown in the examples, sheets of considerable size have been obtained, for example up to 2.00×3.00 meters, which in virtue of the exceptional properties shown above may be used in constructions for flooring and panelling.

The invention claimed is:

1. A process suitable for manufacturing ceramic glass material in the form of sheets, the process comprising:
   melting an oxide mixture used for manufacturing ceramic glass material to form a vitreous mass;
   refining the vitreous mass thus obtained to form a molten glass material;
   passing the molten glass material through a roller system to form a continuous sheet, wherein the sheet has a dimension of about 2×3 meters;
   annealing the continuous sheet; and
   subjecting the continuous sheet to a thermal crystallization cycle after said annealing, wherein said oxide mixture comprises: $SiO_2$: 50%-80%; $Al_2O_3$: 5%-30%; and $Li_2O$: about 7% to about 11%, wherein the ceramic glass material consists essentially of one or more of lithium phyllodisilicate and β-spodumene phase, and wherein the thermal crystallization cycle comprises a last stage of the process before final cooling and is conducted at a temperature from 550° C. to 920° C. for 2 to 6 hours, having a total cycle lasting for 12-25 hours.

2. A process according to claim 1, wherein the oxide mixture further comprises other oxides chosen from the group consisting of ZnO, $P_2O_5$, $K_2O$, $Na_2O$, CaO, MgO, BaO, and $ZrO_2$.

3. A process according to claim 2, wherein said other oxides, if present in the mixture, represent a percentage by weight comprised between respectively: ZnO: 0.1-3%; $P_2O_5$: 0.1-5%; $K_2O$: 1-5%; $Na_2O$: 0.1-6%; CaO: 0.1-6%; MgO: 0.1-6%; BaO: 0.1-5%; and $ZrO_2$: 0.1-4%.

4. A process according to claim 1, wherein the thermal crystallization cycle is conducted beginning from 550° C. and varying the temperature in 20° increases.

5. The process of claim 1 wherein the oxide mixture comprises one of the following compositions represented as a percentage by weight:

| a) $SiO_2$ | 78.57 |
|---|---|
| $Al_2O_3$ | 5.35 |
| ZnO | 0.52 |
| $Li_2O$ | 11.23 |
| $P_2O_5$ | 1.95 |
| $K_2O$ | 2.34; |
| b) $SiO_2$ | 74.47 |
| $Al_2O_3$ | 9.35 |
| ZnO | 0.52 |
| $Li_2O$ | 11.23 |
| $P_2O_5$ | 1.95 |
| $K_2O$ | 2.34; |
| c) $SiO_2$ | 75.50 |
| $Al_2O_3$ | 8.35 |
| ZnO | 0.50 |
| $Li_2O$ | 9.75 |
| $P_2O_5$ | 1.95 |
| $K_2O$ | 2.35 |
| $Na_2O$ | 1.00 |
| CaO | 0.50; |
| d) $SiO_2$ | 77.51 |
| $Al_2O_3$ | 5.35 |
| ZnO | 1.52 |
| $Li_2O$ | 10.23 |
| $P_2O_5$ | 2.95 |
| $K_2O$ | 2.34; |
| e) $SiO_2$ | 78.46 |
| $Al_2O_3$ | 5.35 |
| ZnO | 4.52 |
| $Li_2O$ | 7.23 |
| $P_2O_5$ | 1.95 |
| MgO | 1.00; |
| f) $SiO_2$ | 78.59 |
| $Al_2O_3$ | 5.36 |
| ZnO | 0.52 |
| $Li_2O$ | 11.24 |
| $P_2O_5$ | 1.95 |
| MgO | 3.00 |
| $K_2O$ | 2.34; or |
| g) $SiO_2$ | 75.13 |
| $Al_2O_3$ | 8.31 |
| ZnO | 0.52 |
| $Li_2O$ | 9.68 |
| $P_2O_5$ | 1.94 |
| $K_2O$ | 2.33 |
| BaO | 0.93 |
| $ZrO_2$ | 0.93. |

6. The process according to claim 1, wherein the oxide mixture comprises a melting point of 1500° C. to 1550° C.

7. The process according to claim 1, wherein said annealing is carried out in a controlled temperature oven to relieve mechanical stresses caused to the glass during said passing the molten glass material through a roller system.

8. The process according to claim 7, wherein said annealing is carried out for approximately 1 hour.

* * * * *